United States Patent [19]

Rasmussen

[11] Patent Number: 4,746,194
[45] Date of Patent: May 24, 1988

[54] METHOD OF MOUNTING AN END PORTION OF AN OPTICAL FIBRE IN AN OPTICAL FIBRE CONNECTOR

[76] Inventor: Peter Rasmussen, Rallarbäcksvägen 8, Marieholm, S-330 33 Hillerstorp, Sweden

[21] Appl. No.: 751,494

[22] Filed: Jul. 3, 1985

[30] Foreign Application Priority Data

Jul. 17, 1984 [SE] Sweden .................................. 8403740

[51] Int. Cl.$^4$ ................................................. G02B 6/00
[52] U.S. Cl. .................................. 350/320; 350/96.20; 350/96.10
[58] Field of Search ............... 350/96.10, 96.20, 96.21, 350/96.22, 320

[56] References Cited

U.S. PATENT DOCUMENTS

| | | | |
|---|---|---|---|
| 4,183,619 | 1/1980 | Makuch | 350/96.21 |
| 4,389,091 | 6/1983 | Lidholt et al. | 350/96.20 |
| 4,490,006 | 12/1984 | Lidholt | 350/96.20 |

FOREIGN PATENT DOCUMENTS

| | | | |
|---|---|---|---|
| PCT/SE81/0-0233 | 3/1982 | PCT Int'l Appl. | 350/96.20 |
| 426882 | 2/1983 | Sweden | 350/96.20 |

*Primary Examiner*—William L. Sikes
*Assistant Examiner*—Brian M. Healy
*Attorney, Agent, or Firm*—Holman & Stern

[57] ABSTRACT

In a method for fixing an optical fibre in an optical fibre connector element the fibre is fixed therein by means of centering elements (22) and a curable material (28), for example an adhesive. The centering elements and the curable material are positioned between the envelope of an end portion of the optical fibre (6) and a surface portion (26) of the connector element surrounding said envelope. After the fixing of the fibre end portion in the connector element the end portion of the connector element including the centering elements (22) and the fibre end portion (6) are machined, for example ground, up to a plane (30) which is positioned inside the points of contact between the centering elements (22) and the fibre end portion (6) and between the centering elements (22) and the surface portion (26) of the connector element surrounding the fibre end portion.

3 Claims, 1 Drawing Sheet

METHOD OF MOUNTING AN END PORTION OF AN OPTICAL FIBRE IN AN OPTICAL FIBRE CONNECTOR

BACKGROUND OF THE INVENTION

The present invention relates to a method of mounting an end portion of an optical fibre in an optical fibre connector.

The Swedish patent specification No. 7901398-3 corresponding to Sweden Pat. No. 426,882, describes a method of connecting the end portions of two optical fibres with each other. According to the method described in said patent specification the end portions of the two optical fibres are adjusted and mounted in two separate sleeve-shaped connector elements, and the end portions of the two optical fibres are connected with each other by connecting the sleeve-shaped connector elements with each other by means of a coupling device so that the end surfaces of the end portions of the optical fibres are positioned in contact with each other. According to the patent specification the adjustment of the end portions of the optical fibres in the fibre connector elements is provided by displacing centering elements which for example are ball-shaped into engagement with the envelope surface of the end portion of the optical fibre as well as with the surface of the sleeve-shaped connector element surrounding said envelope. In an embodiment of the method described in said patent specification the fixing of the end portions of the optical fibres in the fibre connector elements is thereupon provided by supplying a curable material, for example an adhesive, to the space between the envelope of the fibre end portions and the surrounding surface portion of the fibre connector element in question.

When using the method according to said patent specification it appears to be a drawback that there is created contact between the centering elements and the optical fibre and between the centering element and the surrounding surface portion of the connector element after the fibre end portions have been adjusted and fixed in the connector elements. The drawback is caused by the fact that said contact exerts stresses to the fibre so that the fibre may be damaged.

SUMMARY OF THE INVENTION

The object of the invention is to provide a method of mounting and fixing an optical fibre in a connector element of the kind described, wherein this drawback is not present.

In order to comply with this object the method according to the invention is characterized in that the end portion of the fibre connector element including the centering elements and the end portion of the optical fibre is machined, for example ground, up to a plane perpendicular to the longitudinal axis of the end portion of the optical fibre and positioned inside the points of contacts between the optical fibre and the centering elements and between the centering elements and the surface portion of the connector element surrounding the fibre, said machining taking place after the end portion of the optical fibre has been adjusted by means of the centering elements and has been fixed by means of the curable material.

Thus, the completed fibre connector element including the optical fibre fixedly mounted therein does not have any direct contact between the centering elements and the optical fibre and between the centering elements and the material of the connector element. On the contrary the fibre is fixed only by means of the curable material which can have suitable properties for preventing the transfer of detrimental stresses to the optical fibre.

In a suitable embodiment of the invention there is used centering elements consisting of glass which is advantageous from the point of view that unlike metal the glass does not create particles which can damage the optical fibre when it is ground as well as from the point of view that the glass is transparent so that it is possible to use a light curable adhesive as the curable material for fixing the optical fibre.

BRIEF DESCRIPTION OF THE DRAWINGS

The invention is described in the following with reference to the accompanying drawing.

DESCRIPTION OF PREFERRED EMBODIMENT

Figure 1:
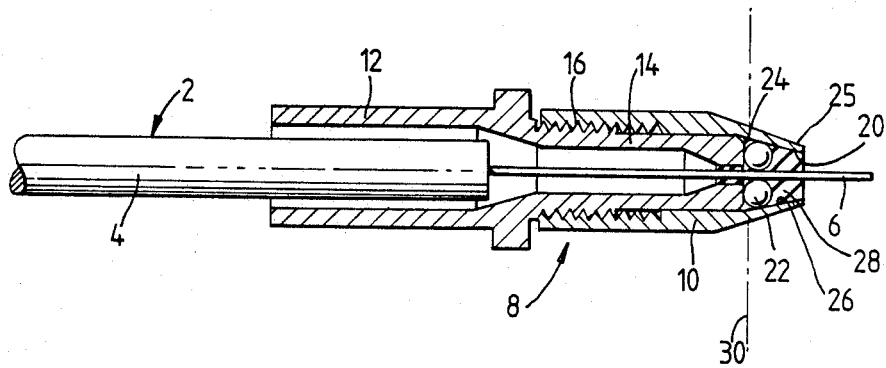
FIGS. 1 and 2 are axial sections of a sleeve-shaped optical fibre connector element illustrating the method for fixing an optical fibre in the connector element according to the invention.

In FIG. 1 there is shown an end portion of a fibre cable 2 comprising a sheath 4 and a fibre which is uncovered at its end portion 6. The fibre cable 2 extends through a sleeve-shaped connector element 8 which consists of a first portion 10 and a second portion 12, the portion 12 having a part 14 extending concentrically with and into the portion 10. The portions 10 and 12 are connected with each other by means of threads 16 which provide an axial displacement of the portions 10 and 12 when the portions are rotated in relation to each other. In order to provide a centering of the fibre end portion 6 in the sleeve-shaped connector element the portion 10 thereof is at its end portion provided with a conical surface portion 20 and three centering elements in the form of balls 22 consisting of glass and engaging the surface portion 20. The end surface 24 of the part 14 projecting into the portion 10 engages the balls 22. Thus, it is realized that it is possible to determine the size of the central opening between the balls 22 by displacing the part 14 in relation to the portion 10 by rotating the part 14 in relation the portion 10, as the positions of the balls 22 in relation to each other will be determined by the positions where the balls engage the conical surface portion 20.

When the fibre end portion is introduced into the sleeve-shaped connector element the part 14 should have such a position in relation to the portion 10 that there is provided between the balls 22 a central opening through which the fibre end portion can be easily moved. After the introduction of the fibre end portion the balls 22 are displaced into engagement with the surface of the fibre end portion 6 as well as with the conical surface portion 20 so that the fibre end portion is adjusted to a central position in the sleeve-shaped connector element 8. At its end portion the sleeve-shaped connector element has a conical outer surface 25 which is concentric with the conical surface portion 20 and is used as an outer reference surface when the connector element is connected with another connector element by means of a suitable coupling element as described in the Swedish patent specification No. 7901398-3.

After the above positioning of the fibre end portion in the sleeve-shaped connector element 8 there is in the method according to the invention provided a fixing of the fibre end portion 6 in relation to the connector element 8 by supplying a curable material 28, for example an epoxy adhesive or a light curing adhesive to the space 26. When using a light curing adhesive the curing is facilitated by the fact that the balls 22 consist of a transparent material, preferably glass.

Figure 2:
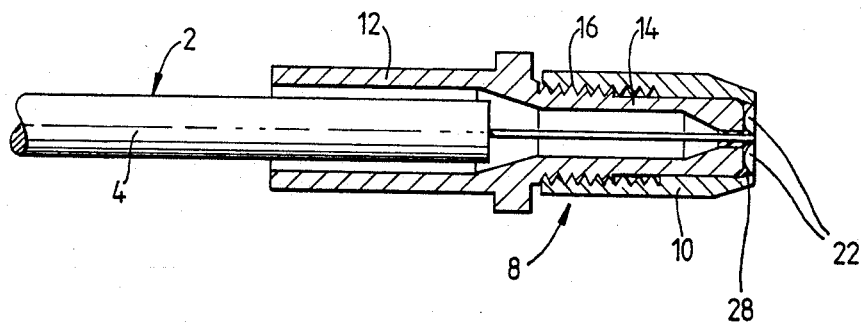

After the curable material has cured and the fibre end portion 6 has thereby been fixed in relation to the sleeve-shaped connector element 8, the end portion of the sleeve-shaped connector element is ground up to the plane provided with reference numeral 30 in FIG. 1. After the grinding the sleeve-shaped connector element 8 has the appearance shown in FIG. 2. Thus, the end portion of the connector element 8 is ground past the points of contact between the balls 22 and the envelope of the fibre end portion and between the balls 22 and the surface portion 20. This means that no pressure or other stresses can be transferred from the outer surfaces of the sleeve-shaped connector element to the optical fibre.

The fact that the balls 22 consist of glass provides that the grinding does not produce particles which can damage the optical fibre.

It is realized that a removal of the end portion of the sleeve-shaped connector element can be provided with other types of machining than grinding.

I claim:

1. A method for mounting and fixing an optical fibre in an optical fibre connector element, in which centering elements are moved into engagement with the envelope of an end portion of the optical fibre as well as with a surface portion of the connector element surrounding said envelope to provide points of contact between the centering elements and the end portion of the optical fibre and further points of contact between the centering elements and said surface portion of the connector element surrounding said envelope and in which the space between the envelope of the fibre end portion and the surface portion of the connector element surrounding said envelope is supplied with a curable material, characterized in that an end portion of the connector element including the centering elements and the fibre end portion is machined away, up to a plane positioned inside the points of contract between the centering elements and the fibre end portion and the further points of contact between the centering elements and the surface portion of the connector element surrounding the fibre end portion, so as to eliminate contact between the centering elements and the optical fibre and between the centering elements and the connector element said machining taking place after the end portion of the optical fibre has been moved into engagement with the centering elements and has been fixed by means of the curable material.

2. A method as claimed in claim 1, characterized in that the durable material is cured by means of light.

3. A method as claimed in claim 2, characterized in that the centering element consist of transparent material, preferably glass.

* * * * *